US006510179B1

(12) United States Patent
Kasezawa et al.

(10) Patent No.: US 6,510,179 B1
(45) Date of Patent: Jan. 21, 2003

(54) VIDEO SIGNAL ENCODING DEVICE

(75) Inventors: Tadashi Kasezawa, Tokyo (JP); Kenichi Asano, Tokyo (JP); Masahiro Kazayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,404

(22) Filed: Dec. 3, 1999

(30) Foreign Application Priority Data

Dec. 4, 1998 (JP) .......................................... 10-345107
Oct. 25, 1999 (JP) .......................................... 11-301894

(51) Int. Cl.[7] .......................... H04N 7/12; H04N 11/02; H04N 11/04
(52) U.S. Cl. ................................... 375/240.28; 348/515
(58) Field of Search ...................... 375/240.28; 348/515

(56) References Cited

U.S. PATENT DOCUMENTS 4,553,176 A * 11/1985 Mendrala .................... 358/334
4,591,909 A * 5/1986 Kuroda ....................... 358/136
6,380,981 B1 * 4/2002 Kasezawa et al. .......... 348/515

FOREIGN PATENT DOCUMENTS

JP          258440          2/1990

* cited by examiner

Primary Examiner—Chris Kelley
Assistant Examiner—Charles Parsons
(74) Attorney, Agent, or Firm—Birch, Stewart, Kolasch & Birch, LLP.

(57) ABSTRACT

The video signal encoding device comprises an encoding frame pulse generating means for generating an encoding frame pulse on the basis of a video input frame pulse signal and a video input clock signal input thereto, as well as a video signal rearranging means for rearranging the frame order of video input signals, together with a video signal write control means and a read control means; wherein the encoding frame pulse generating means generates the encoding frame pulse first by setting a reference phase in accordance with the video input frame pulse, and thereafter dividing the frequency of the video input clock signal to a predetermined number of clock pulses. The video signal read control means controls the read operation of the video signals stored in the video signal rearranging means on the basis of the encoding pulse signal generated by said frame pulse generating means and the video input clock signal.

8 Claims, 10 Drawing Sheets

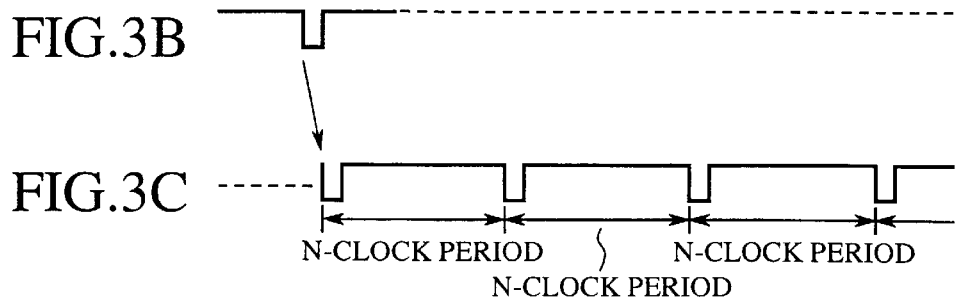
FIG.3B
FIG.3C

FIG.5B
FIG.5C
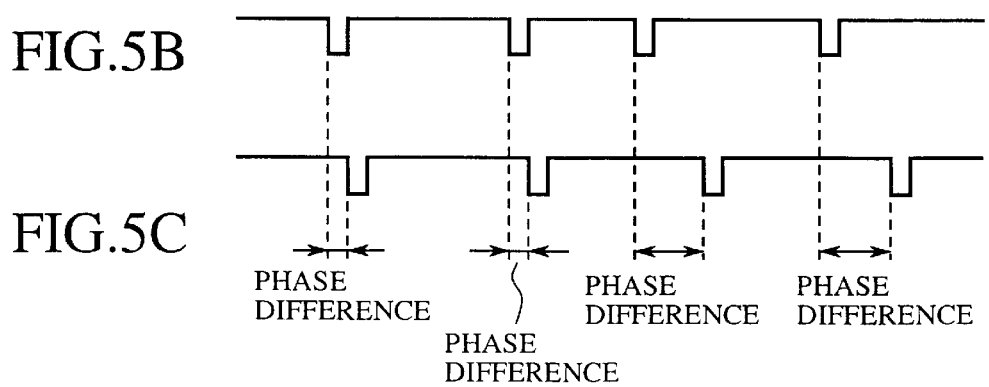

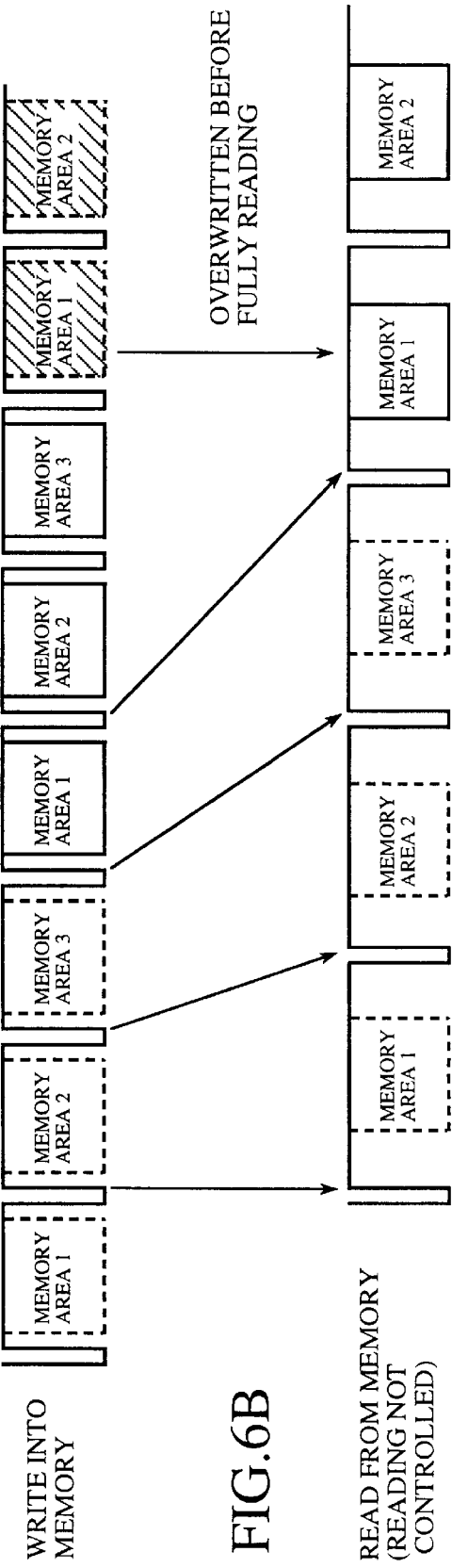
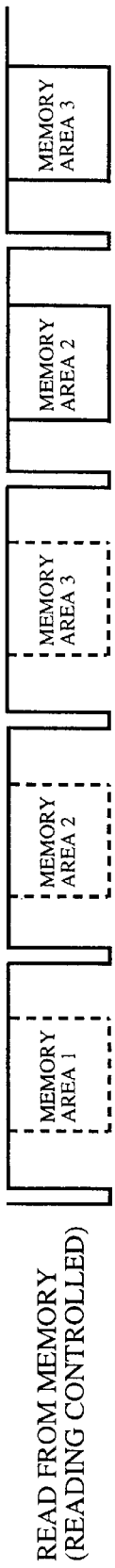
FIG.6A WRITE INTO MEMORY
FIG.6B READ FROM MEMORY (READING NOT CONTROLLED)
FIG.6C READ FROM MEMORY (READING CONTROLLED)

WRITE INTO MEMORY

READ FROM MEMORY
(READING NOT CONTROLLED)

READ FROM MEMORY
(READING CONTROLLED)

VIDEO SIGNAL ENCODING DEVICE

BACKGROUND OF THE INVENTION

1. Field of the Invention

The present invention relates to a video signal encoding device, and more particularly to a video signal encoding device which rearranges the order of a plurality of input video signals before encoding these signals, just like the MPEG (Moving Picture Experts Group) method.

2. Description of the Related Art

The most popular encoding method currently being employed in the field of digital broadcasting or communications is the MPEG method. The principal encoding tools for this MPEG method are the motion compensation prediction and the DCT (Discrete Cosine Transform), and the video input signals are normally encoded after rearranging the order of the frames thereof in order to effectuate this motion compensation prediction.

FIG. 11 is a schematic diagram showing the general configuration of a conventional video signal encoding device designed for use with the MPEG method which is presented as a frame conversion circuit or the like in the Japanese Patent Application Laid-Open No. 2-58440. In the figure, reference numeral 3 denotes a video signal rearranging circuit, numeral 4 denotes a video signal encoding circuit, 5 denotes a video signal write control circuit, 6 denotes a video signal read control circuit, and 1a to 1c denote input terminals for the video signal encoding device, whereas numeral 2a denotes an output terminal therefore.

In the above configuration, a video input signal 201 input through the input terminal 1a is first fed to the video signal rearranging circuit 3. Further, a video input clock signal 204 input through the input terminal 1b and a video input frame pulse 205 input through the input terminal 1c are both fed to the video signal write control circuit 5 and the video signal read control circuit 6. The write control signal 206 as an output of the video signal write control circuit 5 and the read control signal 207 as an output of the video signal read control circuit 6 are fed to the video signal rearranging circuit 3. In the video signal rearranging circuit 3, under the control of reading and writing operations of the video input signal 201 on the basis of the write control signal 206 from the write control circuit 5 and the read control signal 207 from the read control circuit 6, picture frames (or just "frames" hereinafter) of the input signal 201 are rearranged therein so as to output the video signal 202, and as a result, the thus rearranged frames of the video signal 202 in the video signal rearranging circuit 3 are then encoded in the video signal encoding circuit 4, and are thereafter output from the output terminal 2a as a video encoded data 203.

FIGS. 12A and 12B are exemplary views showing an example of the rearrangement of the frames of video signal carried out in the video signal encoding device having the above configuration.

In FIG. 12A, the row of numbers 0, 1, 2, 3, . . . indicates the order of the frames of the video signal which are to be input to the video signal rearranging circuit 3, whereas the other row 2, 0, 1, 5 . . . shown in FIG. 7B indicates the order of the frames rearranged in the video signal rearranging circuit 3, whereby it is shown that the output order of the frames from the video signal rearranging circuit 3 is different from the input order thereof.

Note that the video signal encoding operation carried out in the video signal encoding device is executed normally on the assumption that video signals each having a correct format are successively input.

However, some of the video signals actually input to the video signal encoding device have not correct signal format, as they are fed to a switching circuit or the like before being input to the encoding device.

FIG. 13 shows an example of the horizontal synchronizing signal of an incorrect video signal format. In this figure, there are shown video input frame pulses 205 as one type of the horizontal synchronizing signals of a video signal format, wherein since the video signal 101 and the video input frame pulse 205 as the horizontal synchronizing signal are not switched exactly at the same timing when they pass through a switching circuit or the like, the time interval of each of the video input frame pulses 205 becomes faulty during the synchronizing operation, as can be observed from the figure that the time interval T is converted to T' for example, so that the period for each frame becomes inconsistent.

For this reason, since in the conventional video signal encoding device, it is based on the assumption that the video signals of a correct format are successively input thereto, when a video signal is input in an incorrect format, there has been caused such a problem that a video signal of an incorrect picture content is supplied to the video signal encoding circuit 4, or that a proper encoding processing cannot be conducted with a synchronizing signal of an incorrect video signal format.

SUMMARY OF THE INVENTION

The present invention has been proposed to solve the problems aforementioned, and it is an object of the present invention to provide a video signal encoding device, which is capable of performing correct encoding operation one after another, even if a video signal of an incorrect format is input thereto.

In order to achieve the above object, a video signal encoding device according to the first aspect of the present invention comprises: a video signal rearranging means for rearranging the frame order of video input signals; an encoding frame pulse generating means for generating an encoding frame pulse on the basis of a video input frame pulse and a video input clock signal; a video signal write control means for controlling the write operation of the video signals to the video signal rearranging means on the basis of the video input frame pulse and the video input clock signal, and a video signal read control means for controlling the read operation of the video signals in the video signal rearranging means on the basis of an encoding frame pulse generated by the encoding frame pulse generating means and the video input clock signal.

A video signal encoding device according to the second aspect of the present invention further comprises: an input frame width detection means, which detects a period of one frame (hereinafter may be referred to as "time width of a frame" or just as "frame width") of a video input signal in accordance with the video input clock signal, and outputs the detected result to the video signal read control means, wherein the video signal read control means compares the detected result with a predetermined value or a video input signal of a correct frame format which was previously input, and controls the video signal rearranging means to read a video signal of another frame instead of a video signal of the corresponding frame which was to be read out otherwise, if the input frame width detection means judges that the video signal is not correct.

A video signal encoding device according to another aspect of the present invention is arranged such that the encoding frame pulse generating means generates the encoding frame pulse first by setting a reference phase in accordance with the video input frame pulse, and thereafter dividing the clock frequency of the video input clock signal by a preliminarily stored predetermined number.

A video signal encoding device according to further aspect of the present invention further comprises: an input/output frame phase difference detection means for detecting a phase difference between the video input frame pulse and the encoding frame pulse from the encoding frame pulse generating means, wherein the video signal read control means controls the video signal rearranging means in such a manner as to read out the video signal of a frame other than the video signal of the corresponding frame that was to be read otherwise, when the phase difference detected by the input/output frame phase difference detection means exceeds a predetermined range.

A video signal encoding device according to further aspect of the present invention is arranged such that the frame to be read out is either the frame immediately before or after the corresponding frame which was to be read out otherwise, or the frame immediately before or after the frame which has been judged to be incorrect.

BRIEF DESCRIPTION OF THE DRAWINGS

FIGS. 3A to 3C are exemplary views showing the method of generating an encoding frame pulse 106 by use of an encoding frame pulse generating circuit 9.

FIGS. 5A to 5C are exemplary views showing the method of generating a frame phase difference signal 108 conducted by an input/output frame phase difference detection circuit 8.

FIGS. 6A to 6C are illustrations showing the exemplary case of each of the frame memory circuits 11 in the case where the video signal read control circuit 6 skips off one frame of the input video signal without reading.

DETAILED DESCRIPTION OF THE PREFERRED EMBODIMENTS

First Embodiment

One embodiment of the video signal encoding device according to the present invention is now explained as below.

Figure 1:
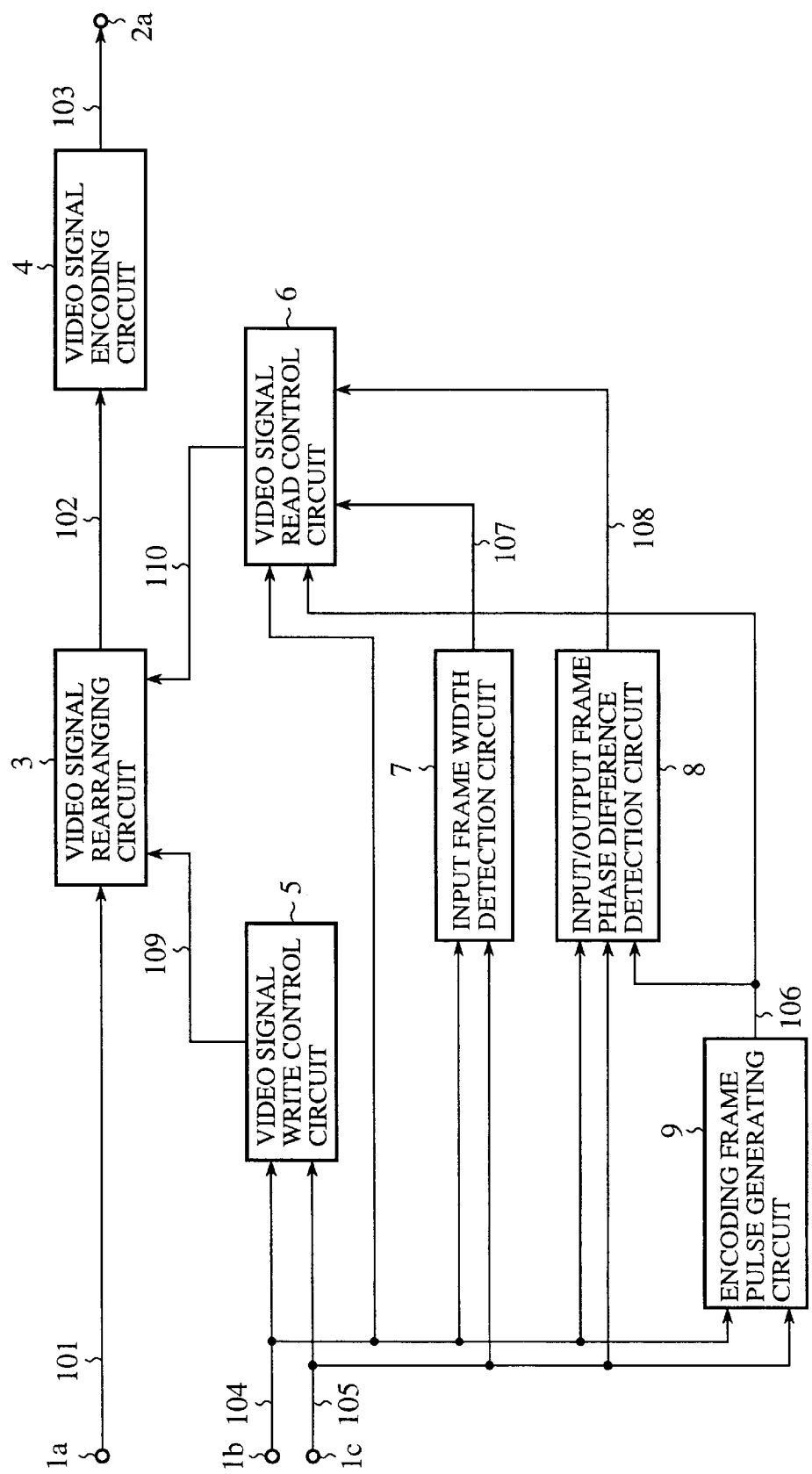
FIG. 1 is a schematic diagram showing the general configuration of the video signal encoding device according to one embodiment of the present invention.

FIG. 1 is a schematic diagram showing the general configuration of the video signal encoding device of the present invention.

In the figure, reference numeral 3 denotes a video signal rearranging circuit, numeral 4 denotes a video signal encoding circuit, 5 denotes a video signal write control circuit, 6 denotes a video signal read control circuit, 7 denotes an input signal frame width detection circuit, 8 denotes an input/output frame phase difference detection circuit, and numeral 9 denotes an encoding frame pulse generating circuit.

Further, reference numerals 1a through 1c denote input terminals, 2a denotes an output terminal, 101 denotes a video input signal, 102 denotes a video input signal whose video frames are rearranged in the video signal rearranging circuit 3, 103 denotes a video encoded data, 104 denotes a video input clock signal, 105 denotes a video input frame pulse, 106 denotes an encoding frame pulse, 107 denotes an output signal of the input frame width detection circuit 7, 108 denotes an output signal of the input/output frame phase difference circuit 8, 109 denotes a write control signal output from the write control circuit 5 and numeral 110 denotes a read control signal output from the read control circuit 6.

The following is an explanation concerning the functional movements of input and output signals within the video signal encoding device.

The video input signal 101 input through the input terminal 1a is supplied to the video signal encoding circuit 4 by way of the video signal rearranging circuit 3. The video encoded data 103 which is an output of the video signal encoding circuit is externally output through the output terminal 2a.

The video input clock signal 104 fed through the input terminal 1b and the video input frame pulse 105 fed through the input terminal 1c are both supplied to all of the video signal write control circuit 5, the input frame width detection circuit 7, the input/output frame phase difference detection circuit 8, and the encoding frame pulse generating circuit 9. In addition, the video input clock signal 104 is fed also to the video signal read control circuit 6.

The encoding frame pulse 106 output from the encoding frame pulse generating circuit 9 is supplied to both the input/output phase difference detection circuit 8 and the video signal read control circuit 6.

Further, an output signal 107 of the input frame width detection circuit 7 (hereinafter may be referred to as a "frame-width signal") and an output signal 108 of the input/output phase difference detection circuit 8 (or just a "phase difference signal") are both supplied to the video signal control circuit 6. A write control signal 109 output from the video signal write control circuit 5 and a read control signal 110 output from the video signal read control circuit 6 are both fed to the video signal rearranging circuit 3.

Figure 2:
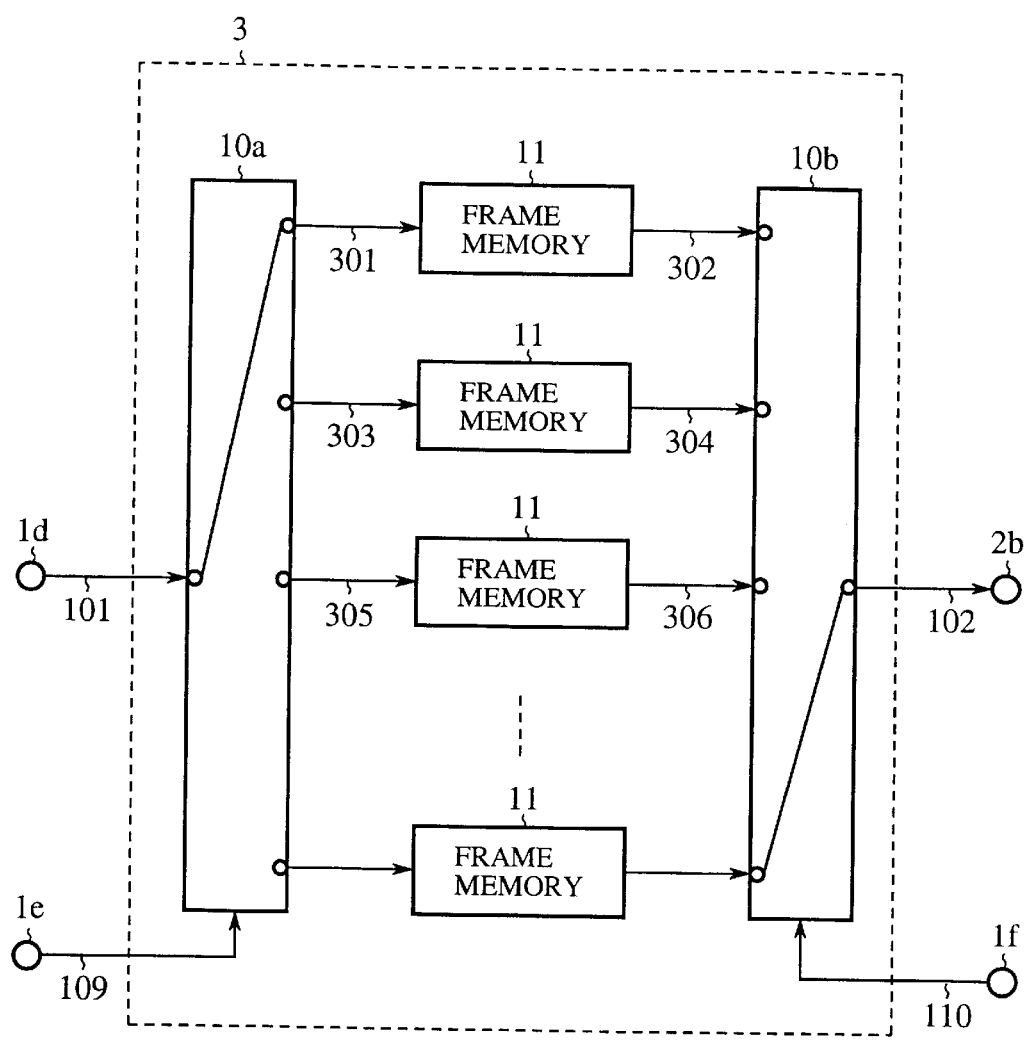
FIG. 2 is an illustration showing an example of a video signal rearranging circuit.

FIG. 2 is an illustration showing an example of a video signal rearranging circuit 3 in the video signal encoding device according to the first embodiment of the present invention. In the figure, reference numeral 10a denotes a selection circuit, 10b denotes a selection circuit, and each of a plurality of reference numeral 11 denotes a frame memory for storing one-frame video input signal 101. Further, reference numeral 1d denotes an input terminal for the video input signal 101, 1e denotes an input terminal for a write control signal 109 output from the video write control circuit 5, 1f denotes an input terminal for a read control signal 110 output from the video read control circuit 6, and numeral 2b denotes an output terminal for the video input signal 102.

Figure 12A:
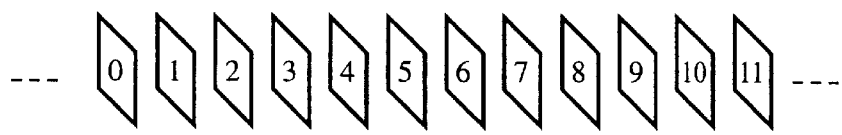
FIGS. 12A and 12B are exemplary views showing the method of rearranging the frame order of the video input signals.
Figure 12B:
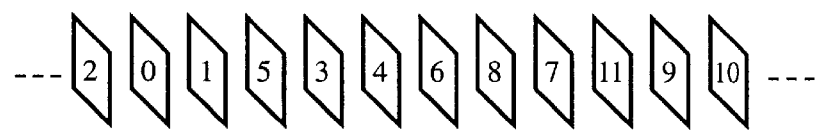

It is to be noted that the video signal rearranging circuit 3 is provided for rearranging the order of video signals as shown in FIG. 12 by changing the selection order of the plurality of frame memories 11 between the selection circuit 1a and the other selection circuit 10b, wherein the reading from and writing into each of the frame memories 11 are conducted under the control of the write control signal 109 from the write control circuit 5 and the read control signal 110 from the read control circuit 6.

The operation of the video signal encoding device according to the first embodiment of the present invention is now explained below.

In FIG. 1, the encoding frame pulse generating circuit 9 generates an encoding frame pulse 106 on the basis of the video input clock signal 104 and the video input frame pulse 105.

Figure 3A:
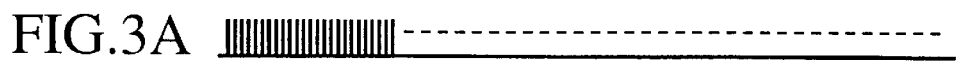

FIGS. 3A to 3C are exemplary views showing the method of generating an encoding frame pulse by use of an encoding frame pulse generating circuit 9. In the figures, FIG. 3A shows a video input clock signal 104, FIG. 3B shows a train of video input frame pulses 105, and FIG. 3C shows a train of encoding frame pulses 106 output from the encoding frame pulse generating circuit 9.

As shown in FIG. 3B, the encoding frame pulse generating circuit 9 first sets a reference phase on the basis of the video input frame pulse 105 that corresponds to the first frame which should be encoded or is just to be encoded, and divides, or counts the frequency of the video input clock signal 104 by a predetermined number (for example N) of video input frame pulses 105 that has been preliminarily stored (for example N), and thereafter automatically generates an encoding frame pulse 106 having an N-clock width which is same as that of the correct video input clock signal 104. It should be noted that this predetermined number N is determined due to the standard of the video input signal 101 fed to this encoding device or the like in preference, and is normally stored or set in the encoding frame pulse generating circuit 9 in advance.

Figure 13:
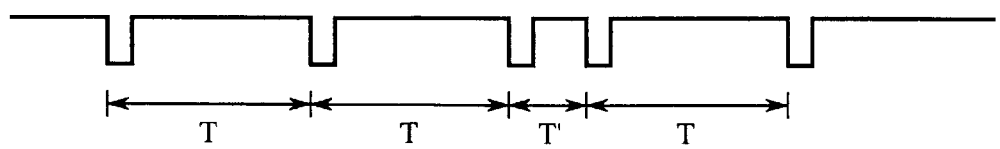
FIG. 13 is an illustration showing an example of the horizontal synchronizing signal as a video signal having an incorrect format.

By this operation, the encoding frame pulse generating circuit 9 can generate an encoding frame pulse 106 and successively output the thus generated encoding frame pulses 106 repeated at every N-clock period which is same as that of the correct video input frame pulse 105, irrespective of the state of the video input frame pulse 105, that is, even in a case that the video input frame pulse 105 has become faulty as shown in FIG. 13 during the operation.

Thereafter, the video signal read control circuit 6 controls the read operation of the video input signals 101 which have been rearranged in the video signal rearranging circuit 3, on the basis of the encoding frame pulse 106 instead of the video input frame pulse 105.

Accordingly, the correct encoding frame pulse 106 can always be input to the video signal read control circuit 6 from the encoding frame pulse generating circuit 9 irrespective of the state of the video input frame pulse signal 105, and the video signal read control circuit 6 controls the read operation of the video input signal 101 conducted in the video signal rearranging circuit 3, so that even when the video input frame pulse 105 is converted to an incorrect one, reading of an incorrect picture frame from the video signal rearranging circuit 3 can be avoided, and thus the video signal rearranging circuit 3 can be prevented from providing it to the video signal encoding circuit 4. As a result, the encoding operation can be performed on the basis of the encoding frame pulses 106 repeated at every N-clock period which is same as that of the correct video input frame pulse 105, irrespective of the state of the video input frame pulse 105.

Further, the input frame width detection circuit 7 detects the time width of one frame of the video input frame pulse by counting the time interval of the video input frame pulse by use of the video input clock signal 104, and outputs the thus counted value 107 to the video signal read control circuit 6 as a frame width signal.

Figure 4A:
FIGS. 4A and 4B are exemplary views showing the method of generating a frame width signal 107 by use of an input frame width detection circuit 7.
Figure 4B:
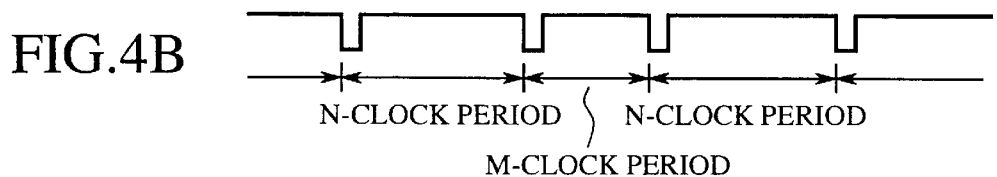

FIGS. 4A and 4B are illustrations showing the method of generating the frame width signal 107 by use of an input frame width detection circuit 7, wherein FIG. 4A shows a video input clock signal 104, and FIG. 4B shows a train of video input frame pulses 105. As shown in FIG. 4B, since the frame width of the first frame of the video frame pulse 105 corresponds to N clocks, the input frame width detection circuit 7 outputs the value of "N clocks" to the video signal read control circuit 6 as a counted value 107. On the other hand, since the frame width of the next second frame pulse corresponds to M clocks, the input frame width detection circuit 7 outputs the value of "N clocks" to the video signal read control circuit 6 as a counted value 107.

The video signal read control circuit 6 inputs the counted value 107 representing the width of one frame of the video input frame pulse 105 from the input frame width detection circuit 7, and compares the value 107 with the one-frame width of a predetermined correct video input frame pulse 105, as well as with the one-frame width of a correct or an assumed-to-be correct video input frame pulse 105 which has been input beforehand, in order to judge whether or not the input value 107 is equivalent to one-frame width of the correct video input frame pulse 105. It should be noted that the frame width of one frame of the video input signal 101 to be fed to this encoding device is, as explained above, predetermined to be equivalent to N clocks in preference for example in accordance with the standard of the video input signal 101 or the like.

In other words, the video signal read control circuit 6 can judge, on the basis of the counted value 107 representing one-frame width of the video input frame pulse 105 from the input frame width detection circuit 7, whether or not the input video signal is of an incorrect format such as the second frame as shown in FIG. 4B, or the third frame as shown in FIG. 13.

As explained above, it is quite possible that a video signal of incorrect format has been stored in one of the frame memories 11 provided within the video signal rearranging circuit 3, if there is an incorrect frame whose one-frame width is not correct. It is to be noted that the video input signal 101 is, in the video signal rearranging circuit 3, stored one by one per each frame in a predetermined order by the selection circuit 10a.

For this reason, when the video signal read control circuit 6 reads out the video input signals 102 in a predetermined order form each of the frame memories 11 within the video signal rearranging circuit 3 on the basis of the encoding frame pulse 106 fed from the encoding frame pulse generating circuit 9, it controls the video signal rearranging circuit 3 in such a manner that it does not read out an incorrect frame from the frame memory 11 which stores the frame whose width is judged to be incorrect by the input frame width detection circuit 7. but reads out instead a correct frame from the frame memory 11 which stores the frame whose width is judged to be correct by the input frame width detection circuit 7.

It is to be noted that in the case of FIG. 4B, since the frame width of only the second frame is of M clocks which is incorrect, whereas those of the first and the third frames are of N clocks which are correct, the video signal read control circuit 6 controls the video signal rearranging circuit 3 such that it does not read out an incorrect frame from the frame memory 11 in which the incorrect frame is stored, but it reads out instead the correct frames from the frame memories 11 in which the first and third correct frames are stored.

Accordingly, the video signal read control circuit 6 can judge whether or not the video signal of incorrect format is fed to the video signal rearranging circuit 3 on the basis of the input frame width detection circuit 7, and as it is arranged such that in case a video signal of incorrect format is input and stored in one of the frame memories 11 within the video signal rearranging circuit 3, another video signal of correct frame is read out from another one of the frame memories 11 of the video signal rearranging circuit 3 under the control of the video signal read control circuit 6, so that the signal whose picture content is an improper one can be suspended from being supplied to the video encoding circuit 4, and as a result, a correct picture image is always supplied from the video signal rearranging circuit 3 to the video signal encoding circuit 4. and thus the video signal encoding circuit can always encode a correct picture image.

Further, due to the repetitive inputs of the video signals of incorrect format, it is quite likely that the writing of video signals to the video signal rearranging circuit 3 becomes impossible, in other words, the state exists in which none of the signals stored in the frame memories 11 has been read out yet, or that the reading of video signals from the video signal rearranging circuit 3 is made impossible, in other words, the state exists in which all the signals stored in the frame memories 11 have been read out.

For these cases above, the input/output frame phase difference detection circuit 8 detects a phase difference between the video input frame pulse 105 and the encoding frame pulse 106 as to all the frames, and outputs a phase difference signal 108 representing the thus detected result to video signal read control circuit 6.

Figure 5A:

FIGS. 5A to 5C are illustrations showing the method of generating a frame phase difference signal 108 which is carried out by the input/output frame phase difference detection circuit 8, wherein FIG. 5A shows a video input clock signal 104, FIG. 5B shows a train of video input frame pulses 105 and FIG. 5C shows a train of encoding frame pulses 106.

As shown in these figures, the input/output frame phase difference detection circuit 8 outputs an input/output phase difference signal 108 representing the phase difference between the video input frame pulse 105 and the encoding frame pulse 106 as to all the frames.

As a result, in a case for example that the writing operation to the frame memories 11 precedes the reading operation therefrom, and the phase difference 108 has come close to a predetermined value, or become greater than the predetermined value, the video signal read control circuit 6 judges on the basis of the phase difference 108 output from the input/output frame phase difference detection circuit that it has come to the state that no more writing operation is possible, that is, before a video signal 102 stored in some frame memory 11 within the video signal read control circuit 6 has not been fully read out, the next writing operation has started to generate an overwriting phenomenon, so that it controls the video signal rearranging circuit 3 in such a manner as to suitably skip off a frame of the signal stored in the corresponding frame memory 11.

FIGS. 6A to 6C are illustrations showing the exemplary case of reading from or writing into the frame memory 11 of this case.

FIG. 6A shows the state that there are three frame memories 11 for convenience, each of which is referred to as memory area 1, 2 and 3, respectively, and that one-frame signal is correctly written into each of these memory areas 1 to 3 at every N clock.

Figure 11:
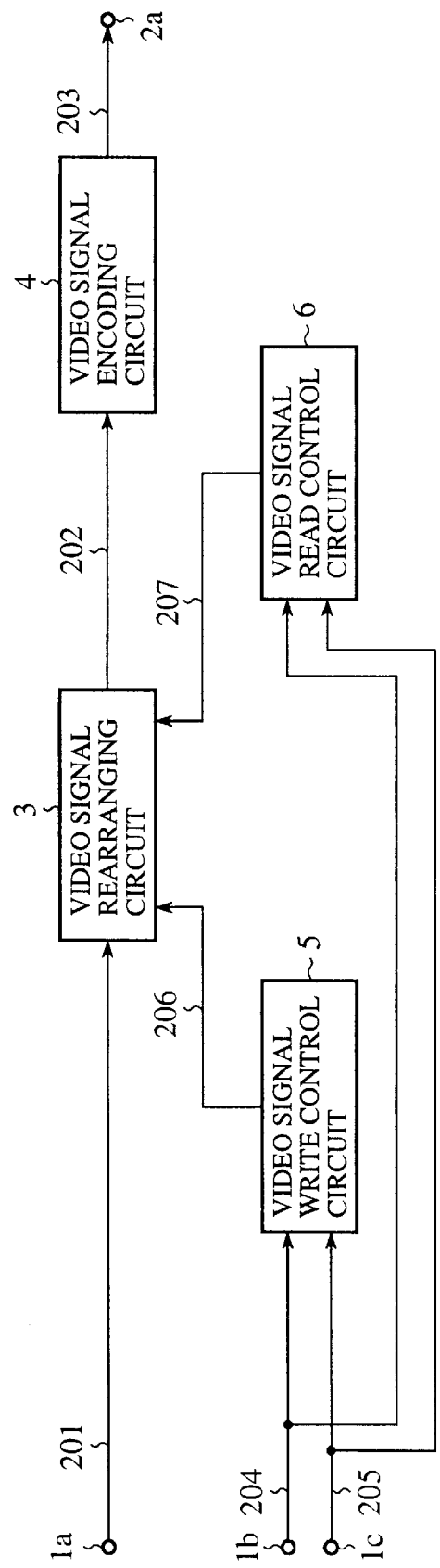
FIG. 11 is a schematic diagram showing a conventional video signal encoding device.

FIG. 6B shows the sate that the video signal read control circuit 6 reads out one-frame signal from each of the frame memories 11 on the basis of the incorrect video frame pulse 205 in the conventional case shown in FIG. 11, wherein the frame width of each frame pulse is greater than the period of N clocks. Due to this, when the video signal read control circuit 6 reads out one-frame signal from each of the frame memories lion the basis of the incorrect video frame pulse 205, in the case where the phase difference between the incorrect video signal frame pulse 205 and the correct video signal frame pulse having a pulse width of N clocks has come close to the period for 3 frames (3 N clocks), the third writing into the memory area 1 is started as shown in FIG. 6A during the second reading of the memory area 1 is still being carried out as shown in FIG. 6B, so that before fully reading out the contents stored by the second writing operation into the memory area 1, the contents stored by the third writing operation into the memory area 2 is overwritten thereon, and thus an incorrect video signal is thereby read out.

For this reason, as shown in FIG. 6C, in the case where the phase difference 108 output from the input/output frame phase difference circuit 8 has come close to the period for 3 frames (3 N clocks), the video signal read control circuit 6 of the first embodiment judges, on the basis of this phase difference 108, that it has come to the state that writing of the video input signal 101 into the memory area 1 is made impossible, or the contents of the memory area 1 has not been read out yet, so that it controls in such a manner as to skip over the contents stored by the second writing operation into the memory area 1, and reads out the contents stored by the second writing operation into the memory area 2, thereby to enable the reading of only the correct video signal 102.

It should be noted that although the present example shown in FIGS. 6A to 6C has been explained as to the case in which 3-frame period is used as the predetermined value in consideration of there being 3 frame memories 11 just for convenience, in the present invention, the concerned frame period can be suitably selected, so that it can be greater than the period of 3 frames, or that of 2 frames, or it can be even one frame period, in consideration of safety in reading of the video signal 102 and also in consideration of synchronization thereof with the sound signal and so on, or may be even shorter than one frame period.

On the other hand, in a case for example that the phase difference 108 is made smaller than the predetermined value, and thus the start of reading operation from the frame memories 11 precedes the end of writing operation thereto, the video signal read control circuit 6 judges that it has come to the state that no more reading operation within the video signal rearranging circuit 3 is possible, and it reads out the same frame again which was read out before, and in this case, the video signal control circuit 6 selects from the frame memories 11 and reads out a frame immediately before or after the frame which has been judged to be incorrect or which was to be read out.

Figure 7A:
FIGS. 7A to 7C are illustrations showing the exemplary case of each of the frame memory circuits 11 in the case where the video signal read control circuit 6 reads one frame of the input video signal twice.
Figure 7B:
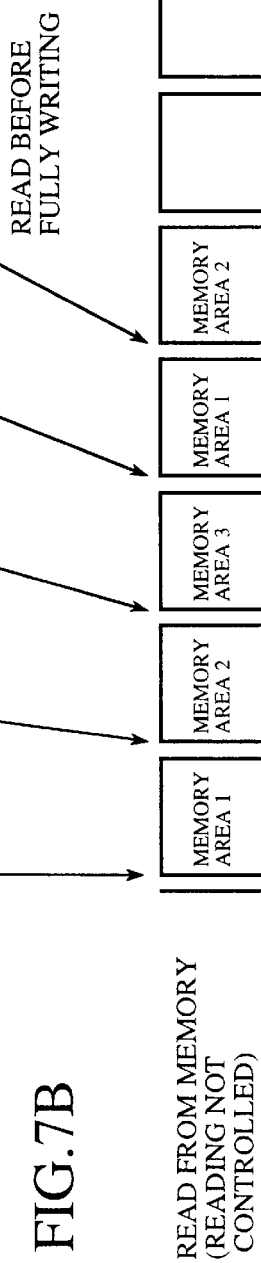
Figure 7C:
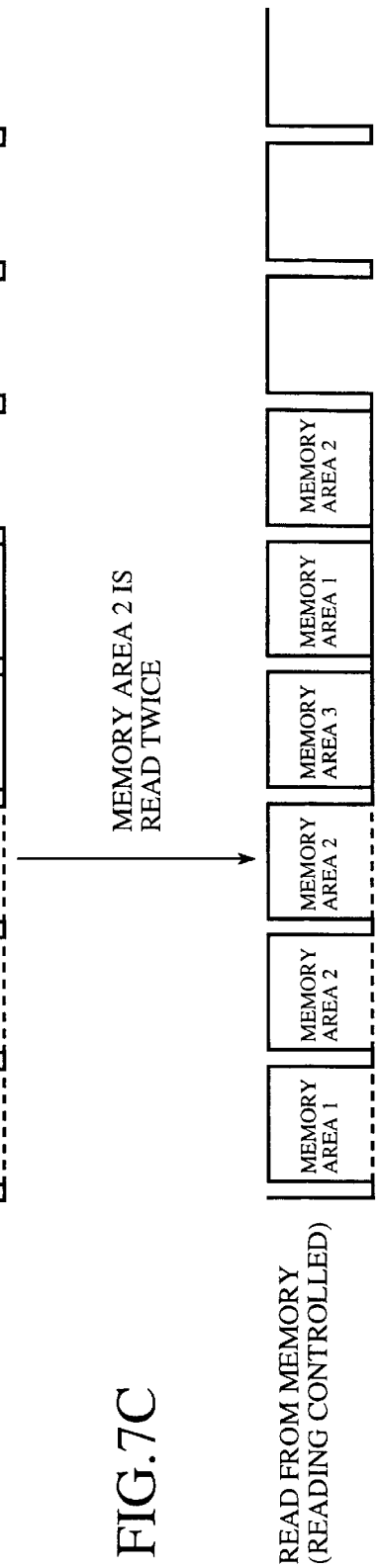

FIGS. 7A to 7C are illustrations showing the exemplary case of reading from or writing into the frame memory 11 of this case.

FIG. 7A shows the state, similarly to FIG. 6A, that there are three frame memories 11, each of which is referred to as memory area 1, 2 and 3, respectively, and that one-frame signal is written into each of these memory areas 1 to 3 at every N clocks.

FIG. 7B shows the sate that the video signal read control circuit 6 reads out one-frame signal from each of the frame memories 11 on the basis of the incorrect video frame pulses 205 in the conventional case shown in FIG. 11, wherein the frame width of each frame pulse is shorter than the period of N clocks. Due to this, when the video signal read control circuit 6 reads out one-frame signal from each of the frame memories 11 on the basis of the incorrect video frame pulse 205, in the case where the phase difference between the incorrect video signal frame pulse 205 and the correct video signal frame pulse having a pulse width of N clocks becomes shorter than the predetermined value which is one frame period (N clock), during the first reading of the memory area 3 is being carried out as shown in FIG. 7B, the first writing into the memory area 3 has not been completed yet as shown in FIG. 7A, so that before completing the first writing into the memory area 3, the first reading from the memory area 1 is started, and an incorrect video signal is thereby read out.

For this reason, as shown in FIG. 7C, in the case where the phase difference 108 output from the input/output frame phase difference circuit 8 has been made shorter than the period for 1 frame (N clock), the video signal read control circuit 6 of the first embodiment judges, on the basis of this phase difference 108, that it has come to the state that reading of the video input signal from the memory area 3 is made impossible, so that it controls the video signal rearranging circuit 3 in such a manner as to read out the contents stored in the memory area 2 which is before the memory area 3 again, and reads out thereafter the contents stored in the memory area 3, by which operation, only a correct video signal 102 can be read out.

It should be noted that although the present example shown in FIGS. 7A to 7C has been explained as to the case in which one frame period is used as the predetermined value, in the present invention the concerned frame period can be suitably selected, so that in consideration of safety in reading of the video signal 102, and also in consideration of synchronization thereof with the sound signal and so on, it can be set greater than one frame period or can be half the one frame period, or even almost 0.

Accordingly, since it is arranged such that the input/output frame phase difference detection circuit 8 outputs a phase difference signal 108 representing the phase difference between the video input frame pulse 105 and the encoding frame pulse 106, and under the control of the video signal read control circuit 6 in accordance with this phase difference signal 1081 the video signal rearranging circuit 3 skips off an incorrect video signal stored in a certain frame memory 11 within the video signal rearranging circuit 3, or repetitively reads out a correct video signal stored in another certain frame memory 11 instead of the incorrect video signal. Due to this, even if the phase difference between the video input frame pulse 105 and the encoding frame pulse 106 is an incorrect one, a correct video signal can be provided without a significant loss of any video signal, and as a result, video signals are supplied one after another to the video signal encoding circuit 4, so that correct picture frames can be successively encoded.

Specifically, as it is arranged such that the video signal rearranging circuit 3 reads out a frame immediately before or after the frame which was to be read out otherwise or the frame which has been judged to be incorrect, video signals can be supplied to the video signal encoding circuit 4 in such a manner as not to impair the successive motion of a resultant picture image, so that correct picture frames can thereby be encoded one after another.

Figure 8:
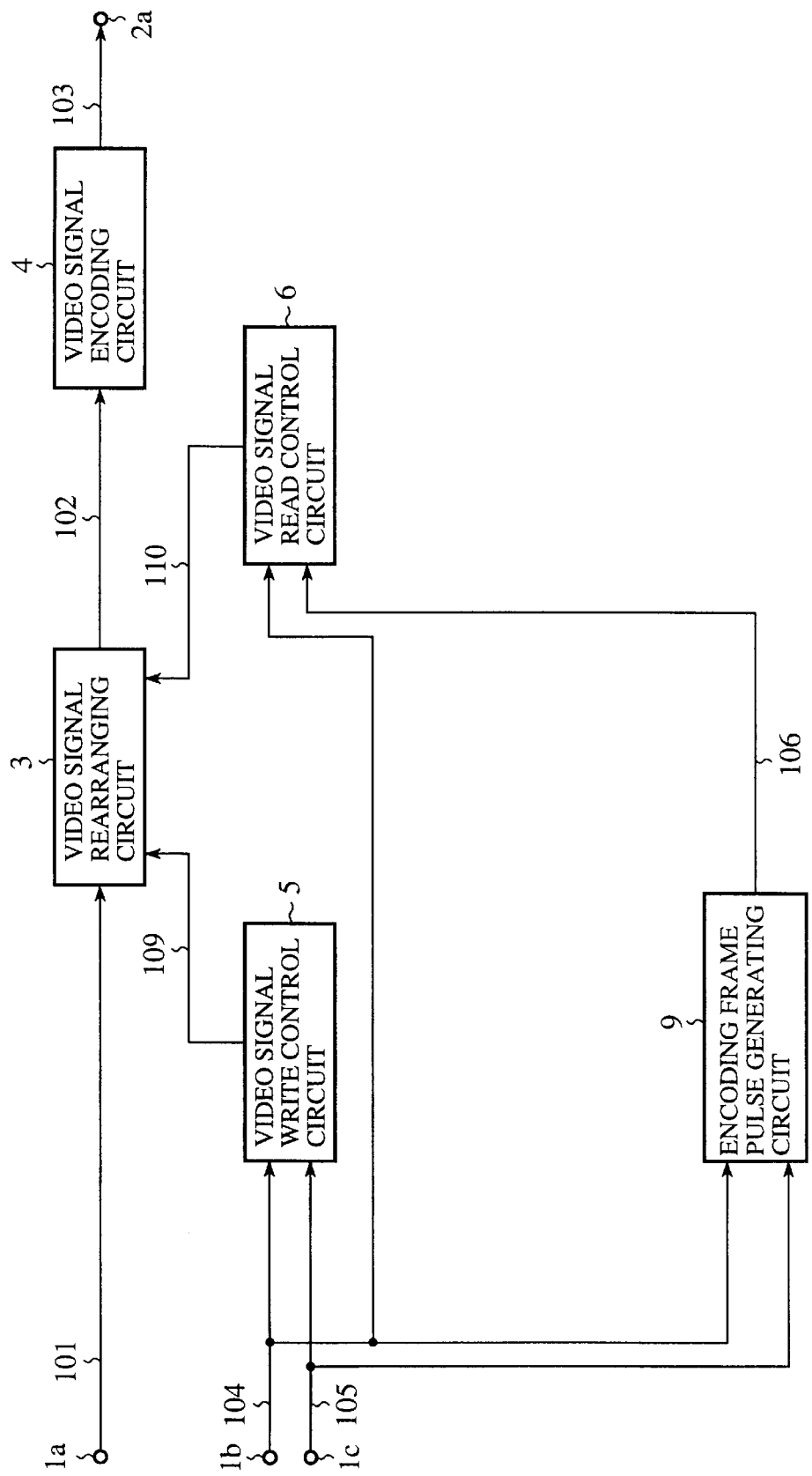
FIG. 8 is a schematic diagram showing the video signal encoding device according to another embodiment of the present invention, in which only the encoding frame pulse generating circuit 9 is provided therein independently.
Figure 9:
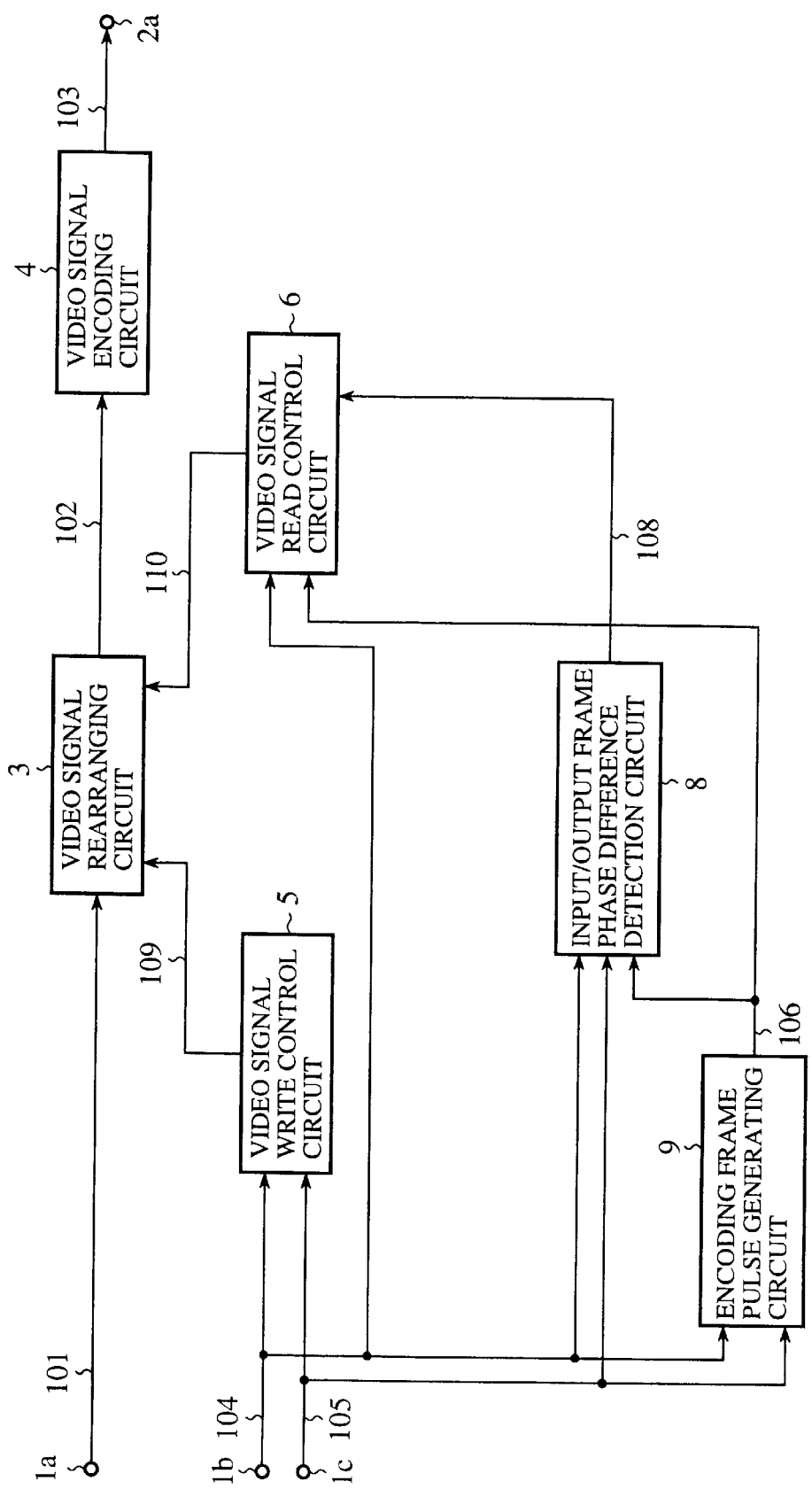
FIG. 9 is a schematic diagram showing the video signal encoding device according to another embodiment of the present invention, in which the encoding frame pulse generating circuit 9 and the input frame phase difference detection circuit 8 only are provided in combination therein.
Figure 10:
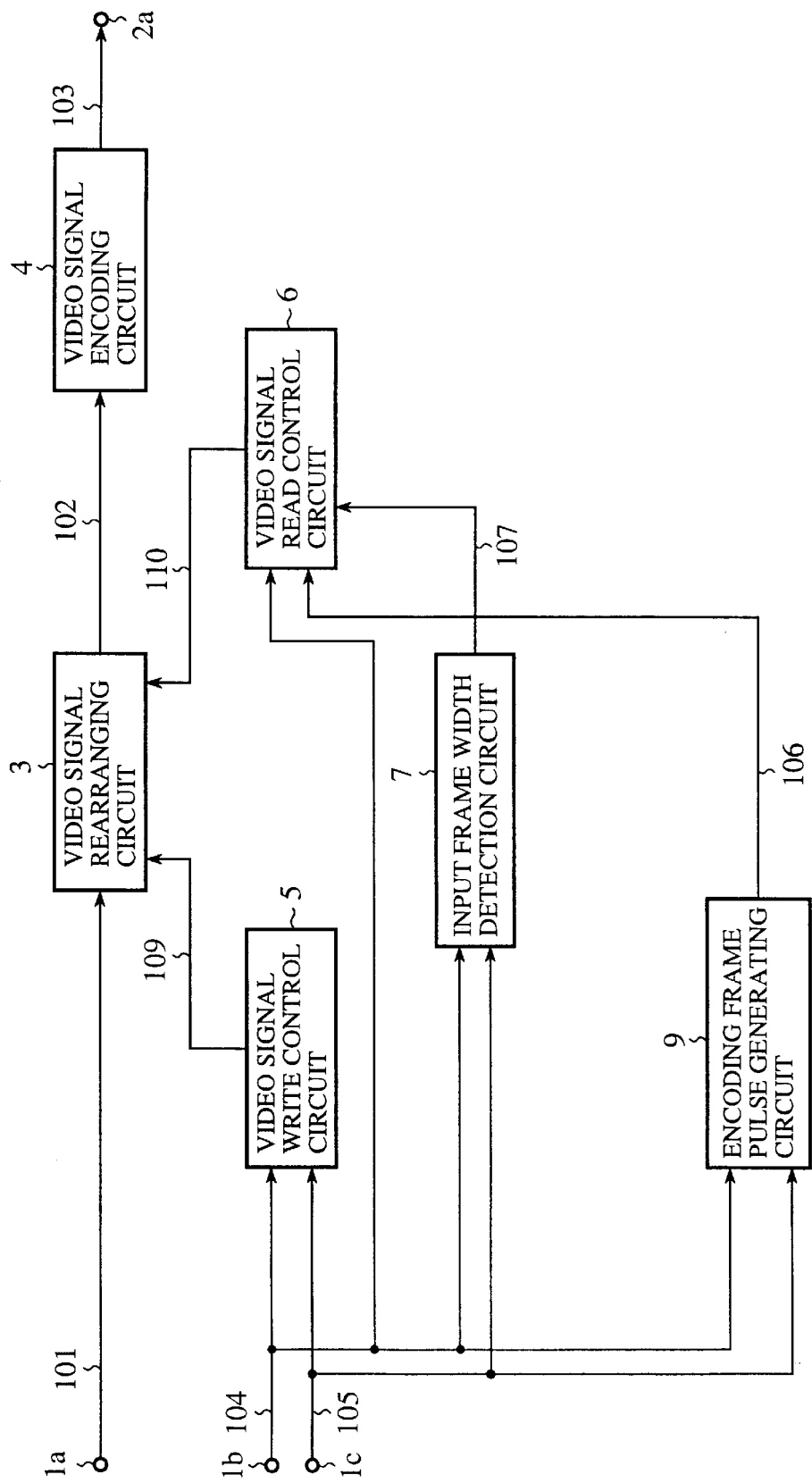
FIG. 10 is a schematic diagram showing the video signal encoding device according to another embodiment of the present invention, in which the encoding frame pulse generating circuit 9 and the input frame width detection circuit 7 only are provided in combination therein.

By the way, although the video signal encoding device according to the present embodiment has been explained as being provided further with all of the encoding frame pulse generating circuit 9, the input frame width detection circuit 7 and also with the input/output phase difference detection circuit 8, in addition to the basic video signal rearranging circuit 3, the video signal encoding circuit 4, the write control circuit 5 and the video signal read control circuit 6, it can be constructed in such a manner as to be additionally provided, for example, only with the encoding frame pulse generating circuit 9 for example as shown in FIG. 8, or can be provided with a combination of the encoding frame pulse generating circuit 9 and the input/output phase difference detection circuit 8 as shown in FIG. 9, or also can be provided with a combination of the encoding frame pulse generating circuit 9 and the input frame width detection circuit 7 as shown in FIG. 10.

It is to be noted, however, that by these configurations, the effect of the sole encoding frame pulse generating circuit 9, that of the combination of the encoding frame pulse generating circuit 9 and the input/output phase difference detection circuit 8, and also that of the combination of the encoding frame pulse generating circuit 9 and the input frame width detection circuit 7 can be obtained, respectively.

Further, the video signal encoding device according to the present embodiment has been explained such that it controls the video signal rearranging circuit 3 in order to read out a video signal of correct format already stored in the frame memories instead of a video signal of incorrect frame format, or a video signal of an incorrect frame width.

However, in the case of an interlace-mode input operation, one entire correct frame is not necessarily read out, but it suffices if only one field thereof can be read out. In other words, the frame or field to be read out should not be limited to such frame or field, which is input one frame or field before the incorrect frame or the like, or one frame or field after the incorrect frame.

Still further, the video signal encoding device according to the present embodiment is explained such that the input frame width detection circuit 7 detects whether or not one-frame time width of the input signal is correct. However, the detection conducted by the input frame period detection circuit 7 is not limited to this, but can be arranged such that it detects a time period from the start of the input video signal to the end of the effective range, or detects whether or not the effective range is correct.

As explained heretofore, the present invention is configured in such a manner that an encoding frame pulse generating circuit is provided, which generates a correct encoding frame pulse regardless of whether or not the video input signal is correct, and that a video signal read control circuit reads out the video signal fed from the video signal rearranging circuit on the basis of the encoding frame pulse output from the encoding frame pulse generating circuit and of the video input clock signal, so that the encoding operation of the video input signal can be carried out always on the basis of a correct encoding frame pulse, no matter how the state of the input video signal is.

Further, the present invention is configured in such a manner that an input frame period detection circuit is provided, which detects whether or not the video signal of a corresponding picture frame is correct on the basis of one-frame time length of the input video frame pulse, and that a video signal read control circuit outputs a read control signal so as to read out a correct frame other than the video signal of picture frame that was judged to be incorrect, so that correct picture frames can always be provided to the video signal encoding circuit, and thus correct encoding can be operated.

Still further, the present invention is configured in such a manner that an input/output frame phase difference circuit is provided, which detects a phase difference between an input frame pulse signal and an encoding frame pulse, and in case the thus detected phase difference has exceeded the predetermined range, a video signal read control circuit outputs a read control signal so as to read out a video signal of another frame instead of a video signal of the frame which was to be read out otherwise, so that video signals can be properly provided one after another to the video signal encoding circuit, and thus correct picture image can be successively encoded.

Yet still further, the present invention is so arranged as to read out a picture frame which is immediately before or after the picture frame which has been judged to be incorrect, or the frame which was to be read out otherwise, so that the video signals can be provided to the video signal encoding circuit in such a manner as not to impair the successive motion of the resultant output picture images, and correct picture images can thus be successively encoded.

What is claimed is:

1. A video signal encoding device comprising:
    a video signal rearranging means for rearranging the frame order of video input signals;
    an encoding frame pulse generating means for generating an encoding frame pulse on the basis of a video input frame pulse and a video input clock signal;
    a video signal write control means for controlling the write operation of the video signals to said video signal rearranging means on the basis of the video input frame pulse and the video input clock signal, and a video signal read control means for controlling the read operation of the video signals in said video signal rearranging means on the basis of an encoding frame pulse generated by said encoding frame pulse generating means and the video input clock signal.

2. A video signal encoding device according to claim 1, wherein said encoding frame pulse generating means generates said encoding frame pulse first by setting a reference phase in accordance with the video input frame pulse, and thereafter dividing the clock frequency of the video input clock signal by a preliminarily stored predetermined number.

3. A video signal encoding device according to claim 1 further comprising:
    an input/output frame phase difference detection means for detecting a phase difference between the video input frame pulse and said encoding frame pulse from said encoding frame pulse generating means, wherein said video signal read control means controls said video signal rearranging means in such a manner as to read out the video signal of a frame other than the video signal of the corresponding frame that was to be read out otherwise, when the phase difference detected by said input/output frame phase difference detection means exceeds a predetermined range.

4. A video signal encoding device according to claim 3, wherein said frame to be read out is either the frame immediately before or after said corresponding frame that was to be read out otherwise, or the frame immediately before or after the frame which has been judged to be incorrect.

5. A video signal encoding device according to claim 1 further comprising:
    an input frame width detection means, which detects one-frame time width of a video input signal in accordance with the video input clock signal, and outputs the detected result to said video signal read control means,
    wherein said video signal read control means compares said detected result with a predetermined value or a video input signal of a correct frame format which was previously input, and controls said video signal rearranging means to read a video signal of another frame instead of a video signal of the corresponding frame that was to be read out otherwise, if said input frame width detection means judges that the video signal is not correct.

6. A video signal encoding device according to claim 5, wherein said encoding frame pulse generating means generates said encoding frame pulse, first by setting a reference phase in accordance with the video input frame pulse, and thereafter dividing the clock frequency of the video input clock signal by a preliminarily stored predetermined number.

7. A video signal encoding device according to claim 5 further comprising:
    an input/output frame phase difference detection means for detecting a phase difference between the video input frame pulse and the said encoding frame pulse from said encoding frame pulse generating means, wherein said video signal read control means controls said video signal rearranging means in such a manner as to read out the video signal of a frame other than the video signal of the corresponding frame that was to be read out otherwise, when the phase difference detected by said input/output frame phase difference detection means exceeds a predetermined range.

8. A video signal encoding device according to claim 7, wherein said frame to be read out is either the frame immediately before or after said corresponding frame that was to be read out otherwise, or the frame immediately before or after the frame which has been judged to be incorrect.

* * * * *